United States Patent [19]

Honda

[11] 4,317,574
[45] Mar. 2, 1982

[54] EXPANDER FOR PISTON RING

[75] Inventor: Shoichi Honda, Tokyo, Japan

[73] Assignee: Honda Giken Kogyo Kabushiki Kaisha, Tokyo, Japan

[21] Appl. No.: 153,019

[22] Filed: May 27, 1980

[30] Foreign Application Priority Data

Jun. 20, 1979 [JP] Japan ............................. 54-84628[U]

[51] Int. Cl.³ .............................................. F16J 9/06
[52] U.S. Cl. .................................................. 277/160
[58] Field of Search ....................... 277/139, 157, 160

[56] References Cited

U.S. PATENT DOCUMENTS

| 1,920,114 | 7/1933 | Solenberger | 277/160 |
| 2,197,983 | 4/1940 | Phillips | 277/160 |
| 2,621,990 | 12/1952 | Szigeti | 277/160 |
| 2,673,770 | 3/1954 | Shirk | 277/160 |

Primary Examiner—Robert I. Smith
Attorney, Agent, or Firm—Lyon & Lyon

[57] ABSTRACT

An expander device for a piston ring comprises a plurality of corrugated resilient expander elements placed one upon another with the corrugations fitted to each other.

4 Claims, 3 Drawing Figures

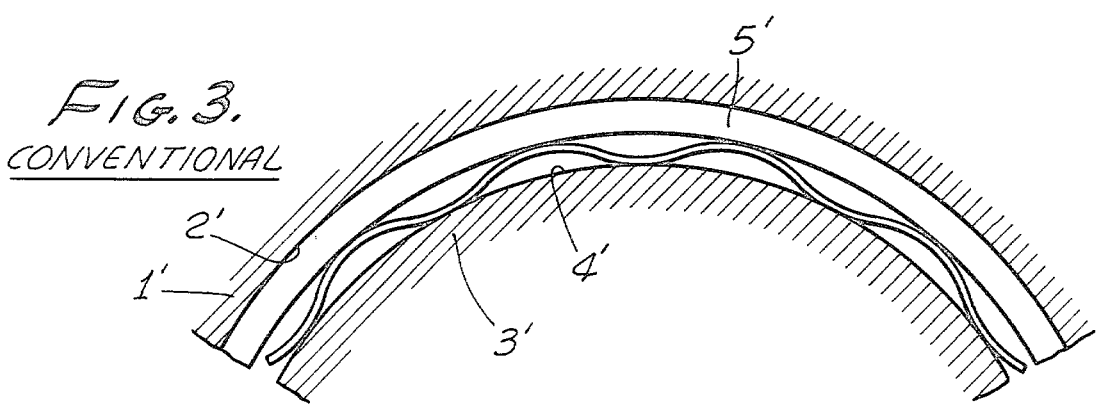
FIG. 3.
CONVENTIONAL

EXPANDER FOR PISTON RING

This invention relates to an expander device for use behind a piston ring of an internal combustion engine or the like. The expander device rests in the piston groove which receives the piston ring, and increases the contact pressure between the piston ring and the encircling wall.

Generally, in an internal combustion engine, the piston ring fitted into a piston ring groove may not in some cases develop sufficient pressure against the encircling cylinder wall, and thus fail to provide the necessary sealing performance. To remedy this shortcoming, it has been the practice to place a resilient expander between the bottom of the piston ring groove and the internal periphery of the piston ring, thereby increasing the sealing pressure between the piston ring and the cylinder wall.

Conventional piston ring expanders use only a single corrugated expander ring, the crests of the corrugations contacting the bottom of the piston ring groove as well as the inner periphery of the piston ring. However, in the use of such a single expander ring, an increase in uniform surface pressure can be obtained only by increasing the thickness of the expander ring or by spacing the corrugations closer together. In either of these cases, the spring constant of the expander device increases substantially so that the "deflection allowance" for ensuring the required surface pressure is not obtainable. Furthermore, in the case of the single corrugated expander ring, there develops an unavoidable variation in the height of the crests of the corrugations from the viewpoint of manufacture. If the manufacturing "tolerance" reaches a value close to the "deflection allowance", variation in the load among the crests increases to unacceptable proportions. In actual design, if the load is increased for ensuring a high surface pressure, the "deflection allowance" practically equals the "tolerance" in some cases, and the expander device develops a great variation in the load, that is, in the surface pressure, and in stress in the expander device. If the load is excessively great, the stress becomes too high and may possibly result in a failure of the expander device, such as damage or breakage. If the load is too small, the surface pressure becomes too low and results in deterioration of sealing performance.

Moreover, if an attempt is made to eliminate the disadvantages described above by reducing the number of crests and increasing the thickness of the single expander ring, the intervals at which the piston ring is pressed from its back side become greater, and this causes non-uniform surface pressure between the piston ring and the cylinder wall. This results in an increase of uneven wear and lack of adequate sealing against blow-by gas.

It is an important feature of this invention to provide a corrugated expander device for a piston ring to give the piston ring uniformly high sealing pressure throughout its periphery. This is accomplished by employing a plurality of corrugated resilient expander rings placed one upon another with the corrugations fitted to each other.

Other objects and advantages will appear hereinafter.

In the drawings:

FIG. 3 is a view similar to FIG. 2 showing a conventional expander device comprising a single corrugated ring.

Figure 1:
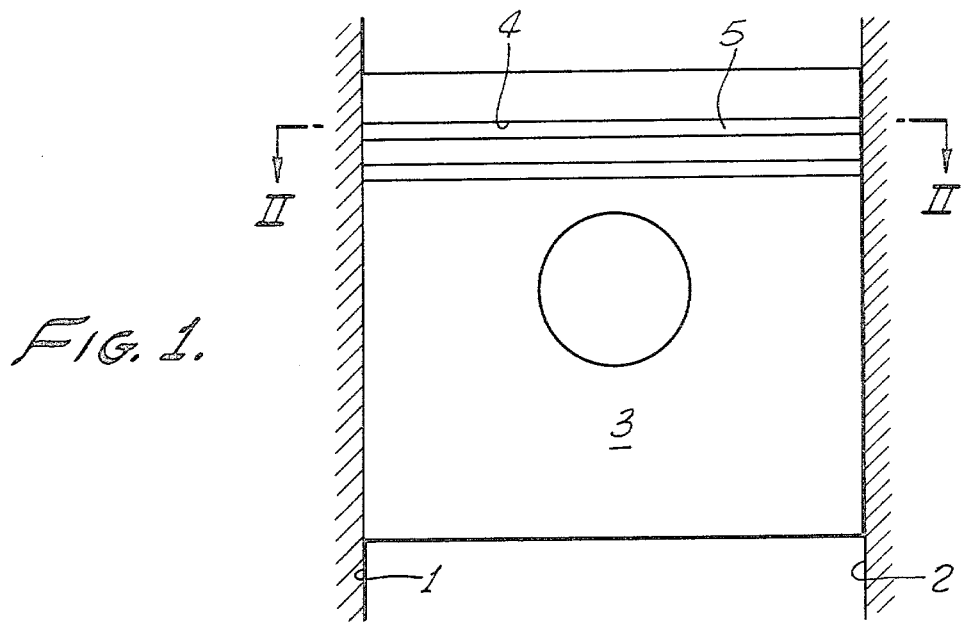
FIG. 1 is a side elevation showing a piston mounted to reciprocate in a cylinder.
Figure 2:
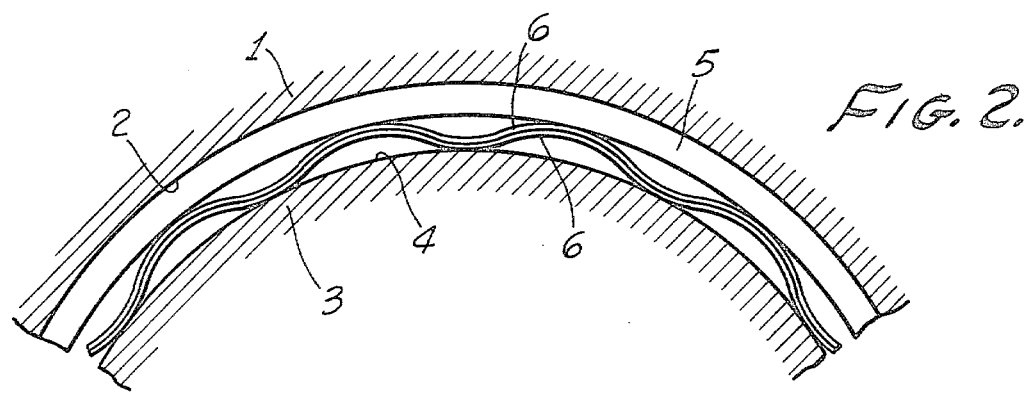
FIG. 2 is a sectional detail taken substantially on the lines II—II as shown on FIG. 1.

Referring to the drawings, a piston 3 is mounted to reciprocate within a cylinder wall 2 in a cylinder block 1. A piston ring 5 is received in the piston ring groove 4 formed in the piston 3. Between the bottom of the groove 4 and the internal periphery of the piston ring 5 is placed an expander device of this invention, comprising a pair of resilient corrugated expander rings placed one upon the other with the corrugations fitted to each other.

The following explanation is given to show why the spring constant is lower and the flexibility is improved when the plural expander ring device of this invention is employed, in contrast to the conventional expander ring device having only one corrugated ring:

When the pitch Pi of the crest of an expander ring is a fixed value, the amount of deflection $\delta$ of an expander of corrugated periphery and the magnitude of its stress $\sigma$ are as follows:

$$\delta \alpha P/EI, \sigma \alpha P/Z$$

where

E: modulus of longitudinal elasticity of the corrugated ring material
I: moment of inertia of the corrugated ring section
P: load per unit crest of corrugated ring
Z: modulus section of corrugated ring
Assuming, for a conventional single expander ring:
B: width
T: thickness
and assuming with respect to the plural expander rings of this invention:
B: width
t: thickness of a single expander ring The conditions for comparing these expanders are assumed to be:
$\sigma$: fixed
E: fixed (the same material)
P: fixed
Pi: fixed (number of crests)

The moment of inertia of spring section Io of a conventional expander and its modulus of section of spring Zo are as expressed by the following equations:

$$Io = BT^3/12, Zo = BT^2/6$$

On the other hand, the moment of inertia of spring section $I_1$ of a plural expander in accordance with this invention and its modulus of section of spring $Z_1$ are as expressed by the following equations:

$$I_1 = Bt^3/12 \times 2, Z_1 = Bt^2/12 \times 2$$

From the condition that the stress is the same:

$$Zo = Z_1 \text{ or } BT^3/6 = Bt^2/6 \times 2$$

$T = \sqrt{2}t$, placing this in the above-mentioned equation for Io:

$$Io = \frac{B\left(\sqrt{2t}\right)^3}{12} = \frac{Bt^3}{12} \times 2.83$$

On the other hand, because $I_1 = Bt^3/12 \times 2$, then, the ratio of $I_1$ to $I_o$ is:

$$\frac{I_1}{I_o} = \frac{\frac{Bt^3 \times 2}{12}}{\frac{Bt^3}{12} \times 2.83} = 0.71$$

As is clearly seen from this equation, the moment of inertia of spring section $I_1$ of a plural expander in accordance with this invention is 0.71 times the moment of inertia of spring section of a conventional expander. Because the amount of deflection is inversely proportional to this, the ratio of the amount of deflection $\delta_1$ of the plural expander in accordance with this invention to the amount of deflection $\delta_o$ of a conventional expander is:

$$\delta_1/\delta_o = 1/0.71 = 1.41$$

then, it follows that the amount of deflection $\delta_1$ of the plural expander is 1.41 times the amount of deflection $\delta_o$ of the conventional expander.

As is clearly seen from the foregoing equations, under the condition that the stress, load and pitch of corrugation are fixed for either the conventional single expander or the plural expander of this invention, an expander comprising a pair of corrugated expander rings 6 placed one upon another with their corrugations fitted to each other is 1.41 times greater in the amount of deflection as compared with a conventional expander. This means that although manufacturing variation exists in the height of a plurality of crests, the plural expander in accordance with this invention is affected less thereby, does not develop a large variation in the surface pressure and stress, and accomplishes substantially uniform stress and surface pressure over the full periphery.

In the foregoing discussion description is made of a plural expander in accordance with this invention that comprises a pair of expander rings 6 placed one upon another with their corrugations fitted to each other; however, such plural expander may comprise three or more said expander rings 6 placed one upon another, in which case it is possible to reduce the spring constant further for increased flexibility.

And, when the piston 3 is in reciprocating motion in the cylinder bore 2, the piston 3 oscillates in a direction normal to the longitudinal axis of the cylinder bore 2 as much as the clearance between the piston 3 and the cylinder wall. In such oscillation, the conventional single expander moves together with the piston ring 5 in the direction of expansion or contraction to vary the stress, and the rate of variation in the stress is in proportion to the spring constant. Therefore, as described above, by making the spring constant smaller, it is possible to reduce said variation in the stress and to alleviate the fatigue of the expander to reduce chances of its failure, such as damage or breakage.

As is seen from the foregoing, in accordance with this invention an expander is composed from a plurality of expander rings corrugated in the peripheral surface, placed one upon another with those corrugations fitted to each other. By this construction, the spring constant is reduced for increased flexibility as compared with a conventional single expander of corrugated periphery under the same condition. If some manufacturing variation develops in the height of crests, it can provide all over its periphery a uniform load or uniform pressure to the piston ring, improving the seal performance of the piston ring remarkably and reducing the amount of blow-by gas to a minimum. Because excessively large local stresses do not develop, the possibility of a failure is minimized.

And, if variation occurs in the stress applied to the plural expander as a result of reciprocating motion of the piston, reducing the spring constant for increased flexibility in the manner described above results in overall improvement.

Having fully described my invention, it is to be understood that I am not to be limited to the details herein set forth but that my invention is of the full scope of the appended claims.

I claim:

1. For use with a piston ring mounted in a groove on a piston of an internal combustion engine, the improvement comprising: an expander device adapted to be confined to the piston groove behind the piston ring; said expander device comprising a plurality of similar corrugated resilient expander rings, each comprising a substantially continuous strip encircling the piston, said resilient expander rings being placed one upon another in surface contact substantially throughout their annular extent with crests of the corrugations fitted to each other whereby to act in concert to exert a substantially uniform pressure against the inside periphery of the piston ring while at the same time offering increased flexibility when compared to a single expander ring.

2. For use with a substantially continuous piston ring mounted in a groove on a piston of an internal combustion engine, the improvement comprising: an expander device adapted to be confined in the piston groove behind the piston ring, said expander device comprising a plurality of similar corrugated resilient expander rings each comprising a substantially continuous sine wave strip encircling the piston whereby to act in concert to exert substantially uniform pressure against the inside periphery of the piston ring, the crests of said expander rings being placed upon one another with the corrugations fitted to each other in surface contact substantially throughout their annular extent whereby the expander rings together offer increased flexibility when compared to a single expander ring.

3. A piston assembly for an internal combustion engine, the assembly comprising in combination, a piston having a circumferential groove with an annular surface formed therein, a piston ring mounted in the groove, and having a substantially continuous inner surface, expander means confined in the groove between said annular surface in the groove and said inner surface of the ring, said expander means including a plurality of similar corrugated resilient expander rings each comprising a substantially continuous strip which encircles the piston, each of said expander rings being nested one within the other in surface contact substantially throughout their annular extent such that said expander rings act in concert to exert substantially uniform pressure throughout the inner surface of the piston ring while offering at the same time increased flexibility when compared to a single expander ring.

4. The piston assembly defined in claim 3 wherein each of said expander rings has a sinusoidal confirguration.

* * * * *